(12) United States Patent
Zeng et al.

(10) Patent No.: US 9,110,262 B2
(45) Date of Patent: Aug. 18, 2015

(54) SINGLE-FIBER SUBASSEMBLY

(71) Applicant: Huawei Technologies Co., Ltd., Shenzhen, Guangdong (CN)

(72) Inventors: Tongxin Zeng, Shenzhen (CN); Xueming Zhang, Wuhan (CN); Sheng Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/077,936

(22) Filed: Nov. 12, 2013

(65) Prior Publication Data

US 2014/0064657 A1    Mar. 6, 2014

Related U.S. Application Data

(63) Continuation of application No. PCT/CN2012/085021, filed on Nov. 22, 2012.

(30) Foreign Application Priority Data

Nov. 22, 2011   (CN) .......................... 2011 1 0373989

(51) Int. Cl.
*G02B 6/00* (2006.01)
*G02B 5/30* (2006.01)
(Continued)

(52) U.S. Cl.
CPC ............ *G02B 6/4246* (2013.01); *G02B 6/2746* (2013.01); *G02F 1/095* (2013.01);
(Continued)

(58) Field of Classification Search
CPC .................. G02B 2006/12116; G02B 6/4246; G02B 6/2746; G02B 6/272; G02B 6/27; G02B 6/2773; G02B 6/278; G02B 6/2793; G02B 6/4208; G02F 1/095; G02F 1/09; G02F 1/0955
USPC .......................... 385/11; 359/484.01–484.05, 359/485.03–485.04, 489.01, 489.06, 359/489.07, 489.08, 489.09, 489.12, 359/489.13, 489.15, 489.17, 490.01; 398/135, 138, 139, 140, 141, 152
See application file for complete search history.

(56) References Cited

U.S. PATENT DOCUMENTS 4,712,880 A    12/1987 Shirasaki
5,345,329 A *  9/1994 Shirai et al. .................... 359/282
(Continued)

FOREIGN PATENT DOCUMENTS

CN    1251426 A    4/2000
CN    2485662 Y    4/2002
(Continued)

*Primary Examiner* — Ryan Lepisto
*Assistant Examiner* — Guy Anderson

(57) ABSTRACT

A single-fiber subassembly includes a first photodiode for receiving incident light, a laser diode for transmitting emergent light, and a same-wavelength optical splitter having a positive direction. The splitter includes a first birefringent plate, a half-wave plate, a 45° Faraday rotator, and a second birefringent plate arranged in sequence along and vertical to the positive direction. An included angle between an optical axis of the first plate and the positive direction is $\alpha$, where $0°<\alpha<90°$; an angle between an e-axis of the half-wave plate and a principal section of the first plate is $\beta$, where $\beta=22.5°$ or $67.5°$. The incident light passes through the splitter along the positive direction; the emergent light passes through the splitter along a direction opposite to the positive direction; and the emergent light is linearly polarized light whose polarization direction is vertical to the principal section of the first plate.

3 Claims, 5 Drawing Sheets

(51) Int. Cl.
*G02B 6/42* (2006.01)
*G02B 6/27* (2006.01)
*G02F 1/095* (2006.01)
*G02B 6/12* (2006.01)
*G02F 1/09* (2006.01)

(52) U.S. Cl.
CPC .............. *G02B 6/27* (2013.01); *G02B 6/272* (2013.01); *G02B 6/278* (2013.01); *G02B 6/2773* (2013.01); *G02B 6/2793* (2013.01); *G02B 6/4208* (2013.01); *G02B 6/4213* (2013.01); *G02B 6/4215* (2013.01); *G02B 2006/12116* (2013.01); *G02F 1/09* (2013.01); *G02F 1/0955* (2013.01)

(56) References Cited

U.S. PATENT DOCUMENTS

| | | | |
|---|---|---|---|
| 6,137,619 A * | 10/2000 | Chen et al. | 359/251 |
| 6,239,900 B1 * | 5/2001 | Chen et al. | 359/282 |
| 6,330,097 B1 * | 12/2001 | Chen et al. | 359/239 |
| 7,031,574 B2 * | 4/2006 | Huang et al. | 385/39 |
| 7,039,278 B1 * | 5/2006 | Huang et al. | 385/47 |
| 2003/0184861 A1 | 10/2003 | Ikari | |
| 2004/0028354 A1 * | 2/2004 | Watanabe | 385/94 |
| 2004/0086214 A1 * | 5/2004 | Huang et al. | 385/11 |
| 2004/0184148 A1 * | 9/2004 | Chang et al. | 359/497 |
| 2005/0018967 A1 | 1/2005 | Huang et al. | |
| 2006/0023987 A1 * | 2/2006 | Yao | 385/11 |
| 2007/0177264 A1 * | 8/2007 | Konno et al. | 359/495 |
| 2008/0042050 A1 * | 2/2008 | Tanaka et al. | 250/225 |
| 2010/0201969 A1 | 8/2010 | Zou et al. | |

FOREIGN PATENT DOCUMENTS

| | | |
|---|---|---|
| CN | 102183828 A | 9/2011 |
| CN | 102401947 A | 4/2012 |
| EP | 0 982 620 A2 | 3/2000 |
| JP | 54-159245 | 12/1979 |
| JP | 07-253559 | 10/1995 |

* cited by examiner

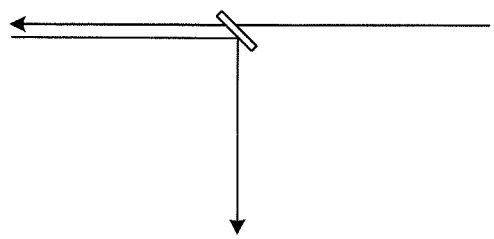
FIG. 1 <Prior Art>
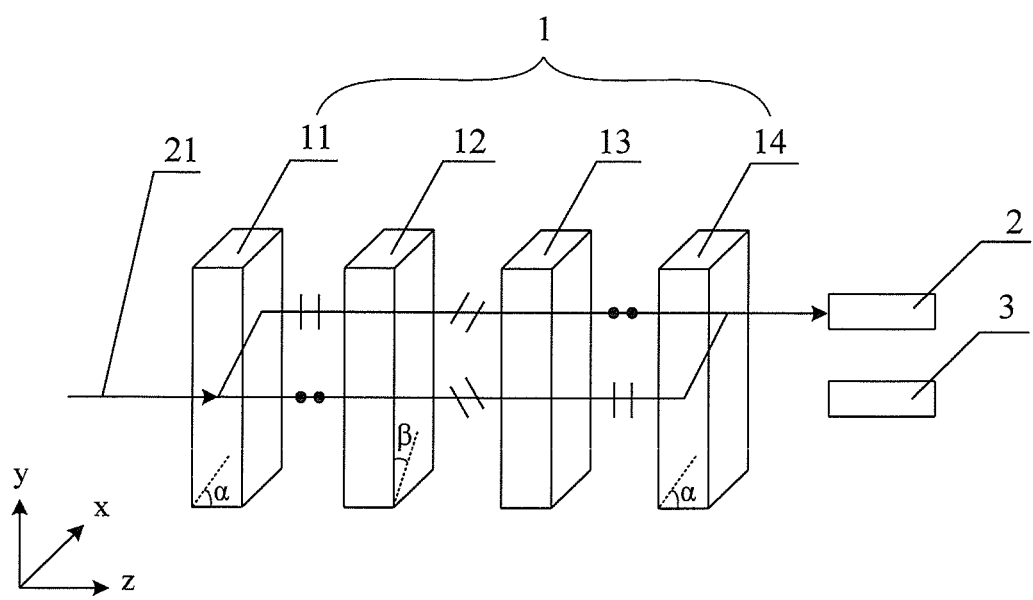
FIG. 2

SINGLE-FIBER SUBASSEMBLY

CROSS-REFERENCE TO RELATED APPLICATIONS

This application is a continuation of International Application No. PCT/CN2012/085021, filed on Nov. 22, 2012, which claims priority to Chinese Patent Application No. 201110373989.7, filed on Nov. 22, 2011, both of which are hereby incorporated by reference in their entireties.

TECHNICAL FIELD

The present invention relates to the field of optical communication technologies, and in particular, to a single-fiber subassembly.

BACKGROUND

Currently, it is difficult to implement single-fiber bi-directional receiving and transmitting of light of the same wavelength, that is, to separate a receiving optical path and a transmitting optical path from each other for the light of the same wavelength by using the same fiber. As shown in FIG. 1, in the prior art, a filter transmits a part of light and reflects apart of light, and therefore, the light in a direction is transmitted directly through the filter, and the light in another direction is reflected at the filter, thereby changing the optical path and separating the receiving optical path and the transmitting optical path from each other for the light of the same wavelength by using the same fiber.

However, with the filter that transmits a part of light and reflects a part of light, the transmit optical power and the receiver sensitivity of the optical subassembly are impaired.

SUMMARY

Embodiments of the present invention provide a single-fiber subassembly to accomplish high transmit optical power and receiver sensitivity.

To solve the above technical problem, the embodiments of the present invention adopt the following technical solutions:

A single-fiber subassembly includes a first photodiode for receiving incident light and a laser diode for transmitting emergent light, and further includes:

a same-wavelength optical splitter having a positive direction and including a first birefringent plate, a half-wave plate, a 45° Faraday rotator, and a second birefringent plate that is the same as the first birefringent plate, which are arranged in sequence along the positive direction and vertical to the positive direction, where:

an included angle between an optical axis of the first birefringent plate and the positive direction is $\alpha$, where $0°<\alpha<90°$;

an angle between an e-axis of the half-wave plate and a principal section of the first birefringent plate is $\beta$, where $\beta=67.5°$ or $\beta=22.5°$;

the incident light passes through the same-wavelength optical splitter along the positive direction;

the emergent light passes through the same-wavelength optical splitter along a direction opposite to the positive direction; and the emergent light is linearly polarized light whose polarization direction is vertical to the principal section of the first birefringent plate.

The same-wavelength optical splitter can separate the receiving optical path and the transmitting optical path from each other. In comparison with the prior art, the lossless transmission of the same-wavelength single-fiber bi-direction is implemented in theory without the need of using a filter that transmits a part of light and reflects apart of light, and high transmit optical power and receiver sensitivity are accomplished.

BRIEF DESCRIPTION OF DRAWINGS

To illustrate the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

FIG. 1 is a schematic diagram of implementing optical path separation by a filter that transmits a part of light and reflects a part of light in the prior art;

FIG. 2 is a schematic diagram of a single-fiber subassembly according to Embodiment 1 of the present invention;

DESCRIPTION OF EMBODIMENTS

Figure 3:
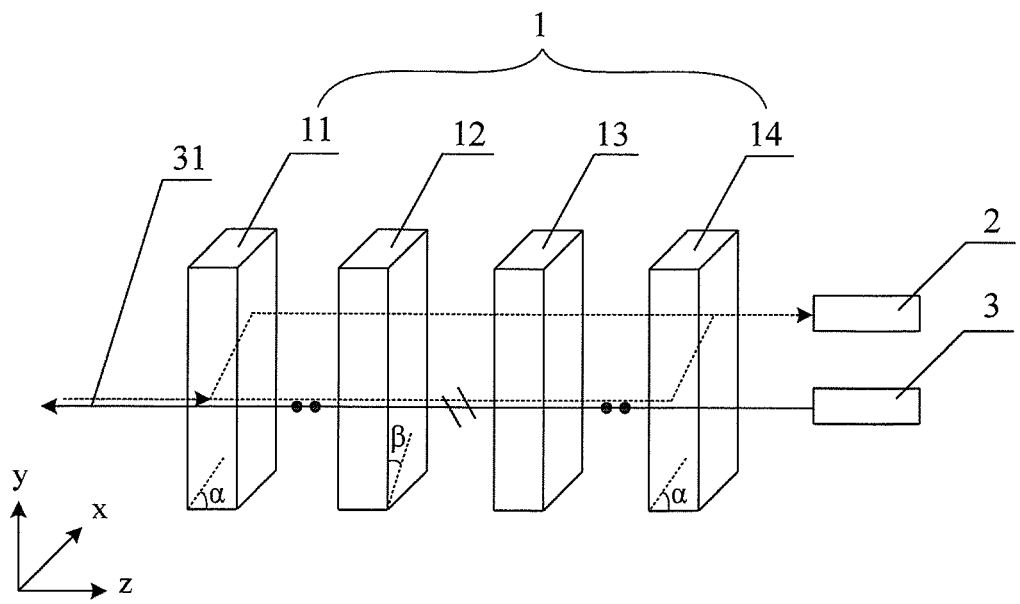
FIG. 3 is a schematic diagram of an optical path of emergent light shown in FIG. 2.

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Embodiment 1

As shown in FIG. 2, this embodiment of the present invention provides a single-fiber subassembly, including a first photodiode (Photo Diode, PD) 2 for receiving incident light 21 and a laser diode 3 (Laser Diode, LD) for transmitting emergent light, and further including: a same-wavelength optical splitter 1 having a positive direction (that is, a z-axis positive direction) and including a first birefringent plate 11, a half-wave plate 12, a 45° Faraday rotator 13, and a second birefringent plate 14 that is the same as the first birefringent plate 11, which are arranged in sequence along the positive direction (that is, the z-axis positive direction) and vertical to the positive direction (that is, the z-axis), where: an included angle between an optical axis of the first birefringent plate 11 and the positive direction (that is, the z-axis positive direction) is $\alpha$, where $0°<\alpha<90°$; and an angle between an e-axis of the half-wave plate 12 and a principal section (that is, a zy plane) of the first birefringent plate 11 is $\beta$, where $\beta=67.5°$ or $\beta=22.5°$.

The following describes the principle of separating the incident light path and the emergent light path from each other, using β=67.5° as an example. In this case, the 45° Faraday rotator 13 is arranged in such a way that: seen from the z-axis positive direction, the polarization direction of the linearly polarized light passing through the 45° Faraday rotator 13 rotates by 45° clockwise. In one aspect, the incident light 21 passes through the same-wavelength optical splitter 1 along the positive direction (that is, the z-axis positive direction). The incident light 21 is the light in an arbitrary polarization state. When passing through the first birefringent plate 11, the incident light is decomposed into two beams of linearly polarized light. One beam is o light whose polarization direction is vertical to the yz plane, and the other beam is e light whose polarization direction is parallel to the yz plane. The o light passes through the first birefringent plate 11 directly, and the e light deviates for a certain distance and then passes through the first birefringent plate 11. When the o light and the e light pass through the half-wave plate 12, the polarization direction of the o light and the polarization direction of the e light each change to a direction symmetric to the e-axis of the half-wave plate 12. That is, seen from the z-axis positive direction, both the polarization direction of the o light and the polarization direction of the e light have rotated by 45° clockwise. Seen from the z-axis positive direction, after the o light and the e light pass through the 45° Faraday rotator 13, their polarization directions have rotated by 45° clockwise. That is, the polarization direction of the o light has rotated by 90° in total, so that the o light becomes parallel to the yz plane, and the polarization direction of the e light has rotated by 90° in total, so that the e light becomes vertical to the yz plane. When the light passes through the second birefringent plate 14, the included angle between the optical axis of the second birefringent plate and the positive direction (that is, the z-axis positive direction) is also a because the second birefringent plate 14 is the same as the first birefringent plate 11. The e light passes through the second birefringent plate 14 and the o light deviates for a certain distance and then combines with the e light into the incident light 21, thereby changing the optical path of the incident light 21 that passes through the same-wavelength optical splitter 1 along the positive direction.

In another aspect, as shown in FIG. 3, the emergent light 31 emitted by the laser diode 3 passes through the same-wavelength optical splitter 1 along a direction (that is, a z-axis negative direction) opposite to the positive direction; and the emergent light 31 is linearly polarized light whose polarization direction is vertical to the principal section (that is, the yz plane) of the first birefringent plate. After the emergent light 31 passes through the second birefringent plate 14 directly and passes through the 45° Faraday rotator 13, seen from the z-axis positive direction, the polarization direction of the emergent light 31 has rotated by 45° clockwise. After the emergent light passes through the half-wave plate 12, the polarization direction of the emergent light 31 changes to a direction symmetric to the e-axis of the half-wave plate 12, that is, seen from the z-axis positive direction, the polarization direction of the emergent light 31 has rotated by 45° counterclockwise. That is, the polarization direction of the emergent light 31 changes back to a direction vertical to the yz plane, and then the emergent light passes through the first birefringent plate 11 directly. The optical path of the emergent light 31 that passes through the same-wavelength optical splitter 1 along a direction opposite to the positive direction remains unchanged.

Similarly to the case of β=67.5°, where β is an angle between the e-axis of the half-wave plate 12 and the principal section (that is, the zy plane) of the first birefringent plate 11, when β=22.5°, the 45° Faraday rotator 13 is arranged in such a way that: seen from the z-axis positive direction, the polarization direction of the linearly polarized light passing through the 45° Faraday rotator 13 rotates by 45° counterclockwise. After the o light and the e light pass through the half-wave plate 12, seen from the z-axis positive direction, both the polarization direction of the o light and the polarization direction of the e light have rotated by 45° counterclockwise, and the 45° Faraday rotator 13 is arranged in a way corresponding to β=22.5°. Seen from the z-axis positive direction, after the o light and the e light pass through the 45° Faraday rotator 13, their polarization directions have rotated by 45° counterclockwise. Similarly, the polarization direction of the o light rotates by 90° in total, so that the o light becomes parallel to the yz plane, and the polarization direction of the e light rotates by 90° in total, so that the e light becomes vertical to the yz plane, thereby changing the optical path of the incident light 21 that passes through the same-wavelength optical splitter 1 along the positive direction. In another aspect, after the emergent light 31 passes through the second birefringent plate 14 directly and passes through the 45° Faraday rotator 13, seen from the z-axis positive direction, the polarization direction of the emergent light 31 has rotated by 45° counterclockwise. After the emergent light passes through the half-wave plate 12, the polarization direction of the emergent light 31 changes to a direction symmetric to the e-axis of the half-wave plate 12, that is, seen from the z-axis positive direction, the polarization direction of the emergent light 31 has rotated by 45° clockwise. Similarly, the polarization direction of the emergent light 31 changes back to a direction vertical to the yz plane, and then the emergent light passes through the first birefringent plate 11 directly. The optical path of the emergent light 31 that passes through the same-wavelength optical splitter 1 along a direction opposite to the positive direction remains unchanged.

In conclusion, the same-wavelength optical splitter is arranged between the fiber and both of the LD and the PD to separate the receiving optical path and the transmitting optical path from each other. In comparison with the prior art, the lossless transmission of the same-wavelength single-fiber bi-direction is implemented in theory without the need of using a filter that transmits a part of light and reflects a part of light, and high transmit optical power and receiver sensitivity are accomplished.

Embodiment 2

Figure 4:
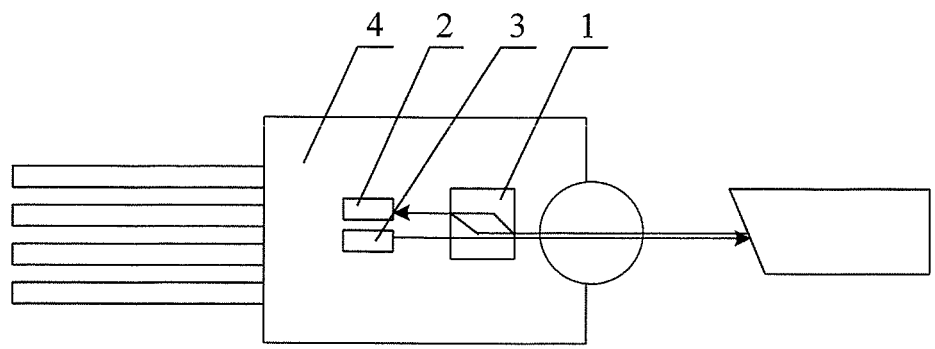
FIG. 4 is a schematic diagram of a single-fiber subassembly according to Embodiment 2 of the present invention.

Based on Embodiment 1, this embodiment of the present invention provides a single-fiber subassembly. As shown in FIG. 4, the single-fiber subassembly further includes a transmitting/receiving transistor outline 4 (Transistor Outline, TO), configured to package a first photodiode 2 and a laser diode 3 together. The structure and the principle of a same-wavelength optical splitter 1 are the same as those in Embodiment 1, and are not repeated herein. Preferably, an included angle between the optical axis of a first birefringent plate and a positive direction is α=47.85° so that the incident light deviates for a longer distance.

The LD and the PD are packaged in the same TO in the single-fiber bi-directional subassembly, and, with the same-wavelength optical splitter, the receiving optical path and the transmitting optical path can be separated from each other. In comparison with the prior art, the lossless transmission of the same-wavelength single-fiber bi-direction is implemented in theory without the need of using a filter that transmits a part of light and reflects a part of light, and high transmit optical power and receiver sensitivity are accomplished. In addition, because no filter is required, optical crosstalk brought by spurious light caused by reflection is reduced.

Embodiment 3

Figure 5:
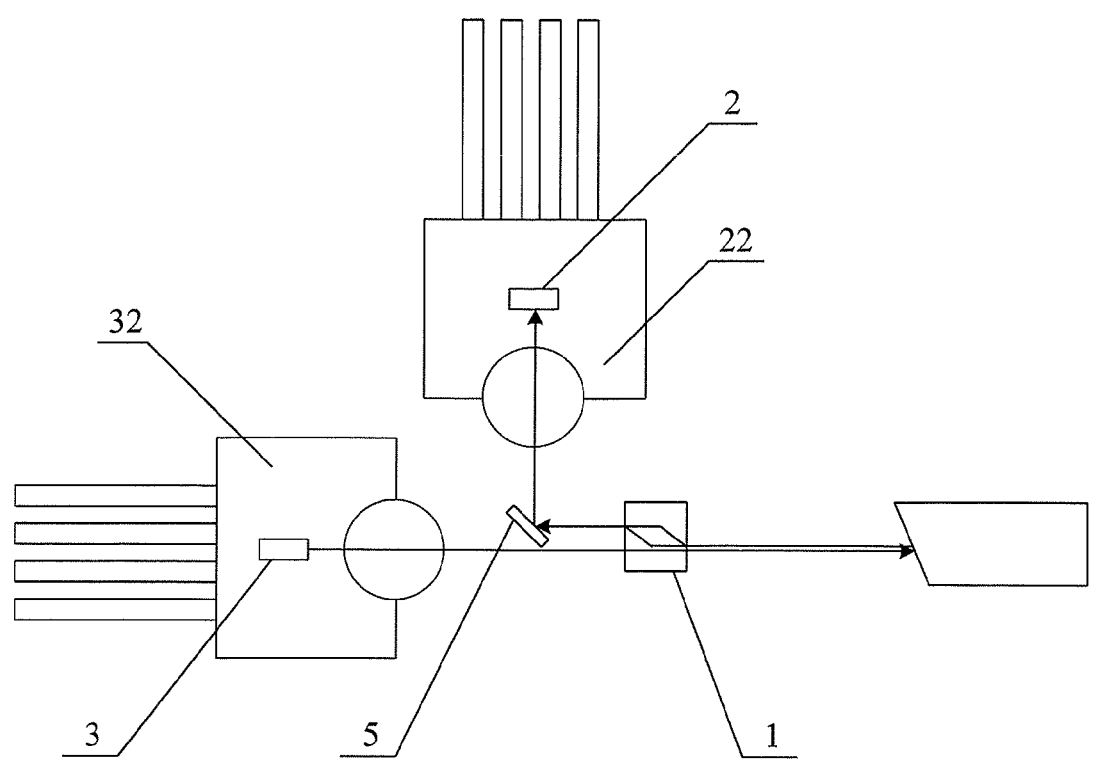
FIG. 5 is a schematic diagram of a single-fiber subassembly according to Embodiment 3 of the present invention.

Based on Embodiment 1, this embodiment of the present invention provides a single-fiber subassembly. As shown in FIG. 5, the single-fiber subassembly further includes: a reflector 5 that is arranged on an incident light path between a first photodiode 2 and a same-wavelength optical splitter 1 and configured to reflect incident light that passes through the same-wavelength optical splitter 1 and enable the first photodiode 2 to receive the incident light; a first receiving transistor outline 22, configured to package the first photodiode 2; and a transmitting transistor outline 32, configured to package a laser diode 3. The structure and the principle of the same-wavelength optical splitter 1 are the same as those in Embodiment 1, and are not repeated herein.

A same-wavelength single-fiber Bi-directional Optical Sub-assembly (Bi-Directional Optical Sub-Assembly, BOSA) is implemented, and, with the same-wavelength optical splitter, the receiving optical path and the transmitting optical path can be separated from each other. In comparison with the prior art, the lossless transmission of the same-wavelength single-fiber bi-direction is implemented in theory without the need of using a filter that transmits a part of light and reflects a part of light, and high transmit optical power and receiver sensitivity are accomplished.

Embodiment 4

Figure 6:
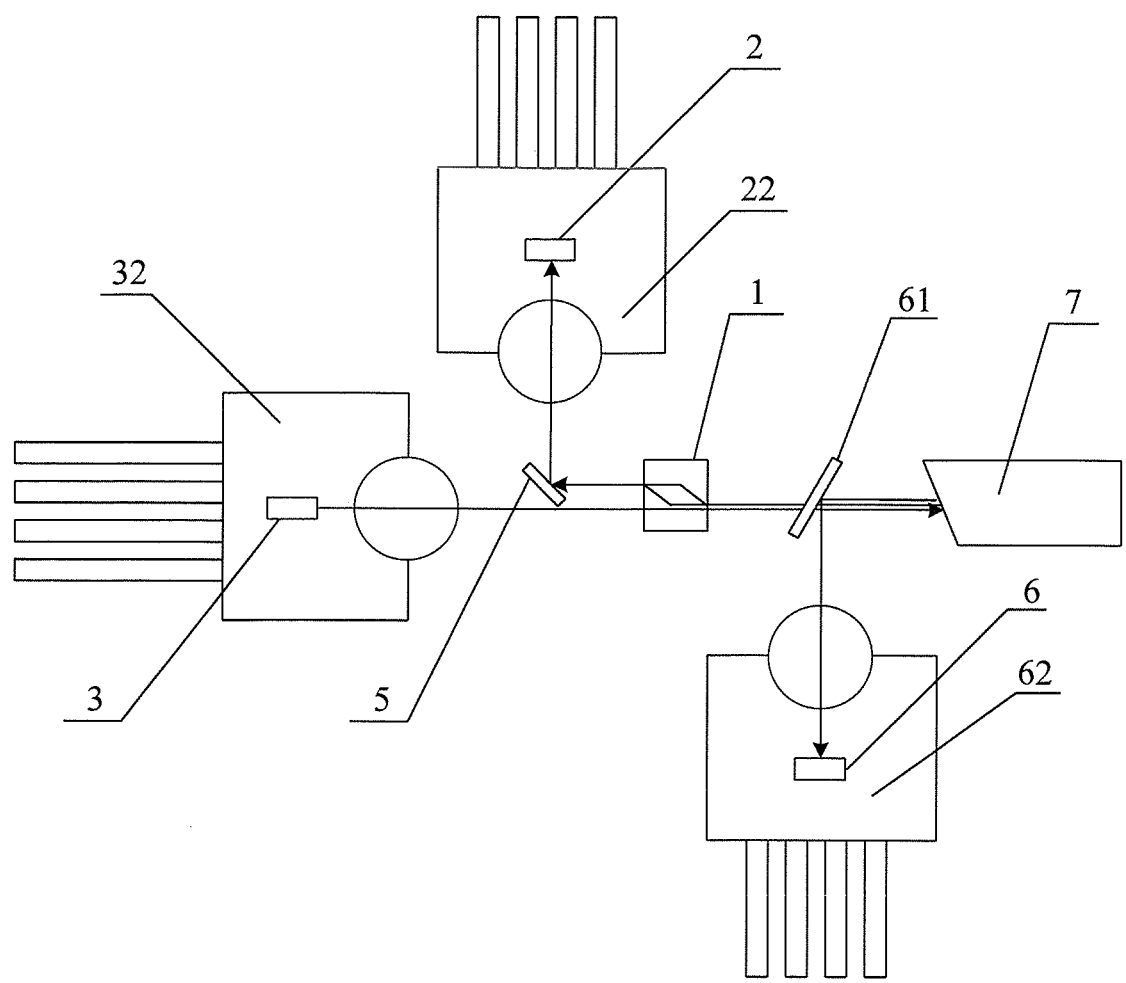
FIG. 6 is a schematic diagram of a single-fiber subassembly according to Embodiment 4 of the present invention.
Figure 7:
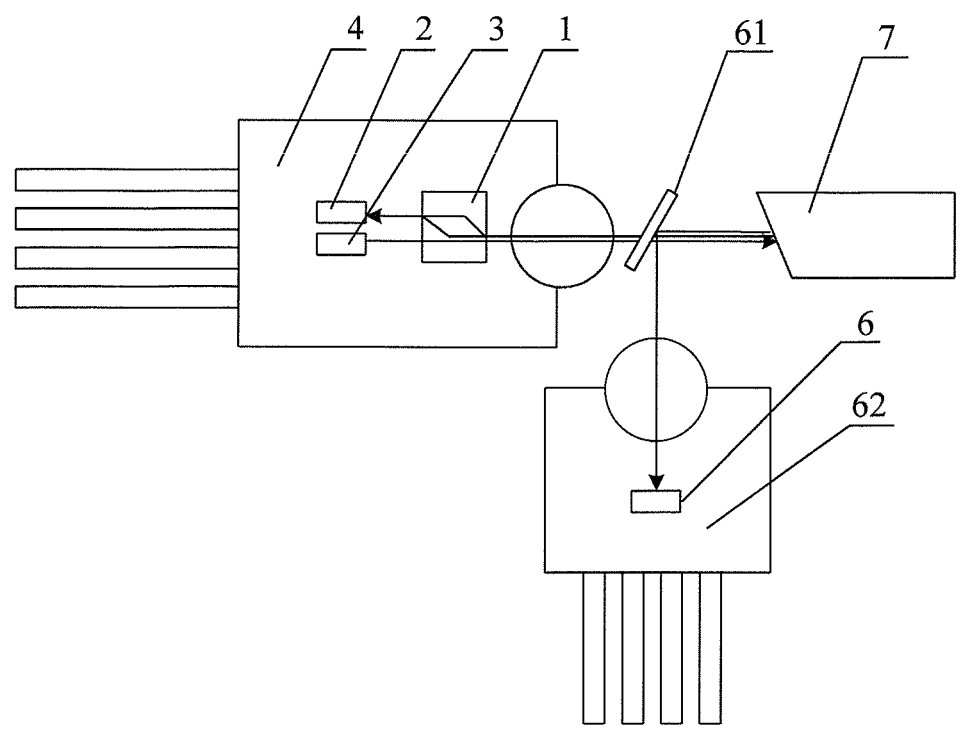
FIG. 7 is a schematic diagram of another single-fiber subassembly according to Embodiment 4 of the present invention.

Based on Embodiment 2 or Embodiment 3, this embodiment of the present invention provides a single-fiber subassembly. As shown in FIG. 6, the single-fiber subassembly further includes: a second photodiode 6, configured to receive light of a specific wavelength; a wavelength-specific filter 61, configured to reflect the light of the specific wavelength and transmit light of other wavelengths; and a second receiving transistor outline 62, configured to package the second photodiode 6; where the wavelength-specific filter 61 and a same-wavelength optical splitter 1 are arranged in sequence along a positive direction. Other structures are the same as those in Embodiment 2, or, as shown in FIG. 7, the same as those in Embodiment 3. The light of a specific wavelength, which is transmitted by a fiber 7, is reflected at the wavelength-specific filter 61 to the second photodiode 6, where the light is received. The other same-wavelength light passes through the wavelength-specific filter 61 directly. The detailed structure and principle are the same as those in the preceding embodiment, and are not repeated herein.

A two-wavelength single-fiber bi-directional subassembly is implemented, and, with the same-wavelength optical splitter, the receiving optical path and the transmitting optical path can be separated from each other. In comparison with the prior art, the lossless transmission of the same-wavelength single-fiber bi-direction is implemented in theory without the need of using a filter that transmits a part of light and reflects a part of light, and high transmit optical power and receiver sensitivity are accomplished.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A single-fiber subassembly, comprising:
a first photodiode for receiving incident light and a laser diode for transmitting emergent light;
a same-wavelength optical splitter having a positive direction and comprising a first birefringent plate, a half-wave plate, a 45° Faraday rotator, and a second birefringent plate that is the same as the first birefringent plate, which are arranged in sequence along the positive direction and oriented perpendicular to the positive direction;
a reflector arranged on an incident light path between the first photodiode and the same-wavelength optical splitter;
a first receiving transistor outline configured to package the first photodiode; and
a transmitting transistor outline configured to package the laser diode,
wherein:
an included angle between an optical axis of the first birefringent plate and the positive direction equals 47.85°,
an angle between an e-axis of the half-wave plate and a principal section of the first birefringent plate is β, wherein β=67.5° or β=22.5°,
the incident light passes through the same-wavelength optical splitter along the positive direction,
the emergent light passes through the same-wavelength optical splitter along a direction opposite to the positive direction, and
the emergent light is linearly polarized light whose polarization direction is perpendicular to the principal section of the first birefringent plate.

2. A single-fiber subassembly, comprising:
a first photodiode for receiving incident light and a laser diode for transmitting emergent light;
a same-wavelength optical splitter having a positive direction and comprising a first birefringent plate, a half-wave plate, a 45° Faraday rotator, and a second birefringent plate that is the same as the first birefringent plate, which are arranged in sequence along the positive direction and oriented perpendicular to the positive direction;
a transmitting/receiving transistor outline configured to package the first photodiode and the laser diode together;
a wavelength-specific filter configured to reflect light of a specific wavelength and transmit light of other wavelengths;
a second photodiode configured to receive the light of the specific wavelength; and
a second receiving transistor outline configured to package the second photodiode;
wherein the wavelength-specific filter and the same-wavelength optical splitter are arranged in sequence along the positive direction, and
wherein:
an included angle between an optical axis of the first birefringent plate and the positive direction equals 47.85°,
an angle between an e-axis of the half-wave plate and a principal section of the first birefringent plate is β, wherein β=67.5° or β=22.5°,
the incident light passes through the same-wavelength optical splitter along the positive direction, the emergent light passes through the same-wavelength optical splitter along a direction opposite to the positive direction, and the emergent light is linearly polarized light whose polarization direction is perpendicular to the principal section of the first birefringent plate.

3. A single-fiber subassembly, comprising:

a first photodiode for receiving incident light and a laser diode for transmitting emergent light;

a same-wavelength optical splitter having a positive direction and comprising a first birefringent plate, a half-wave plate, a 45° Faraday rotator, and a second birefringent plate that is the same as the first birefringent plate, which are arranged in sequence along the positive direction and oriented perpendicular to the positive direction;

a reflector arranged on an incident light path between the first photodiode and the same-wavelength optical splitter;

a first receiving transistor outline configured to package the first photodiode;

a transmitting transistor outline configured to package the laser diode;

a wavelength-specific filter configured to reflect light of a specific wavelength and transmit light of other wavelengths;

a second photodiode configured to receive the light of the specific wavelength; and a second receiving transistor outline configured to package the second photodiode;

wherein the wavelength-specific filter and the same-wavelength optical splitter are arranged in sequence along the positive direction, and wherein:

an included angle between an optical axis of the first birefringent plate and the positive direction equals 47.85°, an angle between an e-axis of the half-wave plate and a principal section of the first birefringent plate is $\beta$, wherein $\beta=67.5°$ or $\beta=22.5°$, the incident light passes through the same-wavelength optical splitter along the positive direction, the emergent light passes through the same-wavelength optical splitter along a direction opposite to the positive direction, and the emergent light is linearly polarized light whose polarization direction is perpendicular to the principal section of the first birefringent plate.

* * * * *